(12) United States Patent
Boyle

(10) Patent No.: US 6,644,714 B2
(45) Date of Patent: Nov. 11, 2003

(54) VISION VISOR APPARATUS AND METHOD FOR USE

(76) Inventor: James A. Boyle, 1513 Olivewood Ave., Lakewood, OH (US) 44107

( * ) Notice: Subject to any disclaimer, the term of this patent is extended or adjusted under 35 U.S.C. 154(b) by 0 days.

(21) Appl. No.: 10/217,571

(22) Filed: Aug. 13, 2002

(65) Prior Publication Data

US 2003/0034665 A1 Feb. 20, 2003

Related U.S. Application Data

(60) Provisional application No. 60/312,151, filed on Aug. 14, 2001.

(51) Int. Cl.[7] .................................................. B60J 3/02
(52) U.S. Cl. ...................................... 296/97.7; 296/97.9
(58) Field of Search ............................... 296/97.1, 97.2, 296/97.4, 97.7, 97.8, 97.9, 97.11

(56) References Cited

U.S. PATENT DOCUMENTS

| | | | | |
|---|---|---|---|---|
| 1,461,289 A | * | 7/1923 | Primrose | |
| 1,525,043 A | * | 2/1925 | Primrose | |
| 1,583,860 A | * | 5/1926 | Simmons | |
| 1,931,438 A | * | 10/1933 | Hitz | |
| 1,941,032 A | * | 12/1933 | Knowles | |
| 2,616,756 A | * | 11/1952 | Labrecque | |
| 3,372,953 A | * | 3/1968 | Weaver | |
| 4,090,732 A | | 5/1978 | Vistitsky | |
| 4,323,275 A | | 4/1982 | Lutz | |
| 4,728,142 A | | 3/1988 | Gavagan | |
| 4,792,176 A | | 12/1988 | Karford | |
| 4,818,011 A | | 4/1989 | Cherian | |
| 4,828,314 A | | 5/1989 | Gavagan | |
| 5,044,685 A | | 9/1991 | Yang | |
| 5,080,309 A | | 1/1992 | Ivins | |
| 5,152,573 A | | 10/1992 | Riera | |
| 5,261,717 A | | 11/1993 | Tsumura et al. | |
| 5,662,371 A | | 9/1997 | Gera et al. | |
| 5,673,957 A | | 10/1997 | Moo et al. | |
| 5,873,621 A | | 2/1999 | Kuighadush et al. | |
| 6,059,347 A | | 5/2000 | Davalos | |
| 6,224,137 B1 | | 5/2001 | Hunker | |
| 6,264,263 B1 | * | 7/2001 | Hayes et al. | 296/97.11 |
| 6,318,787 B1 | | 11/2001 | Fahy | |
| 6,325,442 B1 | | 12/2001 | Hunker | |
| 6,328,371 B1 | | 12/2001 | Mac | |

* cited by examiner

Primary Examiner—Joseph D. Pape
(74) Attorney, Agent, or Firm—Fay, Sharpe, Fagan, Minnich & McKee, LLP

(57) ABSTRACT

A vision visor for a motorized vehicle is provided. The visor includes a visor plate that is at least partially translucent and a post assembly that is adjustably connected to an interior portion of the vehicle. A connector is fastened to the visor plate and adjustably connected to the post assembly, whereby the visor plate may be selectively placed between at least one eye of a driver of the vehicle and light emitted from a light source. A method for using a vision visor for a vehicle is also provided.

20 Claims, 3 Drawing Sheets

VISION VISOR APPARATUS AND METHOD FOR USE

CROSS REFERENCE TO RELATED APPLICATION

This application claims the benefit of U.S. Provisional application Serial No. 60/312,151, filed on Aug. 14, 2001.

FIELD OF THE INVENTION

The present invention relates to the art of visors for vehicles such as cars, trucks, vans, sport-utility vehicles and the like. More particularly, the present invention relates to a visor for use in a vehicle that prevents a driver from being temporarily blinded by the light emitted from the headlights of oncoming traffic and/or from the sun.

BACKGROUND OF THE INVENTION

When driving a first motorized vehicle such as a car, truck, van or sport-utility vehicle at nighttime, the light emitted from the headlights of a second, oncoming vehicle often temporarily blind the driver of the first vehicle. This is because the headlights of the oncoming vehicle point toward the first vehicle and the bright light emitted from the headlights enters the eyes of the driver of the first vehicle, creating a sensory overload in the eyes of the driver of the first vehicle. This sensory overload is sometimes called flash blindness.

Flash blindness typically causes the driver of the first vehicle to lose sight of the road for a period of time that may be up to several seconds. This loss of sight of the road may cause the first vehicle to drive off of the road, strike an object, or both, and is thus an extremely undesirable condition. The temporary loss of sight is exacerbated by the power, i.e., increased light output, of modern headlights, such as those using halogen lamps or high-quality reflectors.

Additionally, flash blindness can occur while a driver is heading in the direction of a rising, setting, or particularly bright sun or other intense light stimulus. The result is again an undesirable condition.

As a result, there is a need for an apparatus that may prevent or diminish the light that reaches the eyes of a driver of a vehicle from the headlights of an oncoming vehicle or from the sun.

BRIEF SUMMARY OF THE INVENTION

In an exemplary embodiment of the present invention, a vision visor for a motorized vehicle is provided. The visor includes a visor plate that is at least partially translucent and a post assembly that is adjustably connected to an interior portion of the vehicle. A connector is fastened to the visor plate and adjustably connected to the post assembly, whereby the visor plate may be selectively placed between at least one eye of a driver of the vehicle and light emitted from a light source.

In another exemplary embodiment of the present invention, a vision visor for a vehicle is provided. The visor includes a visor plate that is at least partially translucent, an upper post having an upper end and a lower end and a lower post having an upper end and a lower end. The upper end of the lower post adjustably engages the lower end of the upper post, the lower end of the lower post engages a dashboard of the vehicle, and the upper end of the upper post engages an inner surface of the roof of the vehicle. At least one connector that is fastened to the visor plate removably engages at least one of the upper post and the lower post.

In yet another exemplary embodiment of the present invention, a method for using a vision visor for a vehicle is provided. The method includes the steps of providing a visor plate that is at least partially translucent and adjustably connected by a post assembly to an interior portion of the vehicle, placing the visor plate between at least one eye of a driver of the vehicle and light emitted from a light source, and removing the visor plate from a substantial portion a the field of vision of the driver when there is no light emitted from the light source.

There are other objects and features of the invention, which will be apparent from the following description and claims.

BRIEF DESCRIPTION OF THE FIGURES

The following is a brief description of the drawings, which are presented for the purpose of illustrating the invention and not for the purpose of limiting the same, and wherein.

DETAILED DESCRIPTION OF THE INVENTION

Figure 1:
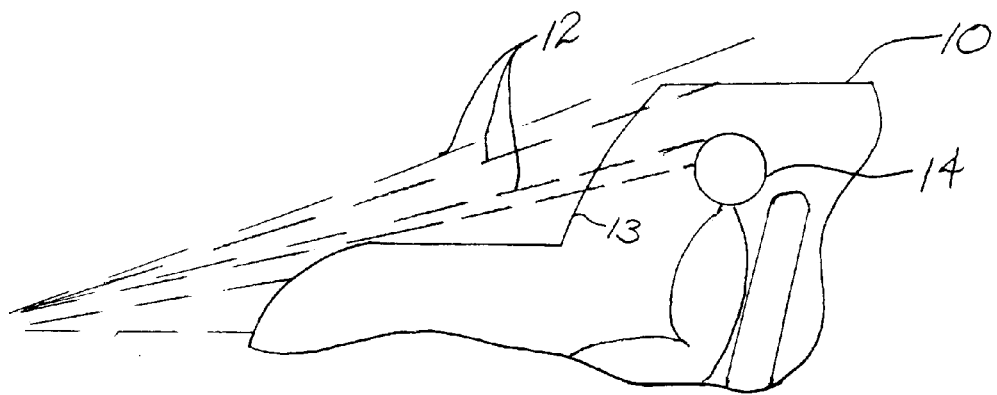
FIG. 1 is a schematic diagram of a vehicle of the prior art.

Referring now to the drawings, wherein the showings are for purposes of illustrating preferred embodiments of the invention and not for the purpose of particularly limiting the same, FIG. 1 illustrates a vehicle 10 without a vision visor of the present invention installed. Light 12 from a light source such as an oncoming vehicle penetrates a windshield 13 of the vehicle 10, which contacts the eyes of the driver 14, causing flash blindness. It is to be noted that the light 12 may come from other sources, such as the sun.

Figure 2:
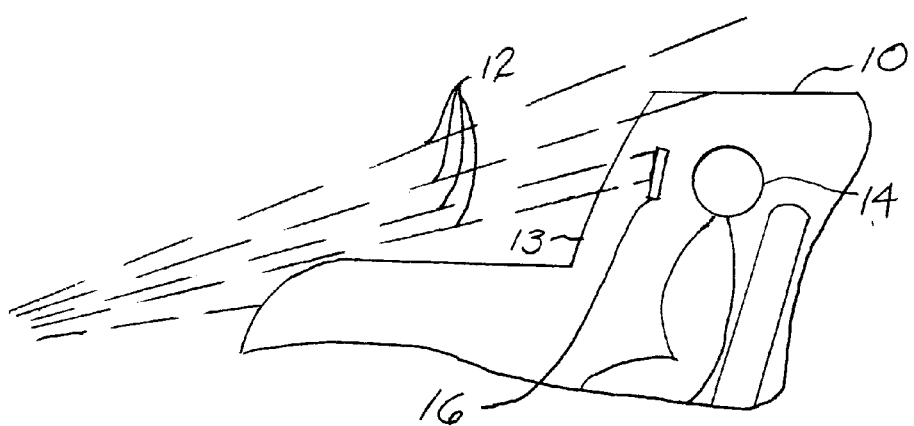
FIG. 2 is a schematic diagram of a vehicle utilizing an embodiment of the present invention.

Turning to FIG. 2, light 12 from a light source again penetrates the windshield 13 of the vehicle 10. However, a vision visor 16 has been installed and prevents at least some of the light 12 from reaching the eyes of the driver 14, thus reducing or preventing flash blindness.

Figure 3:
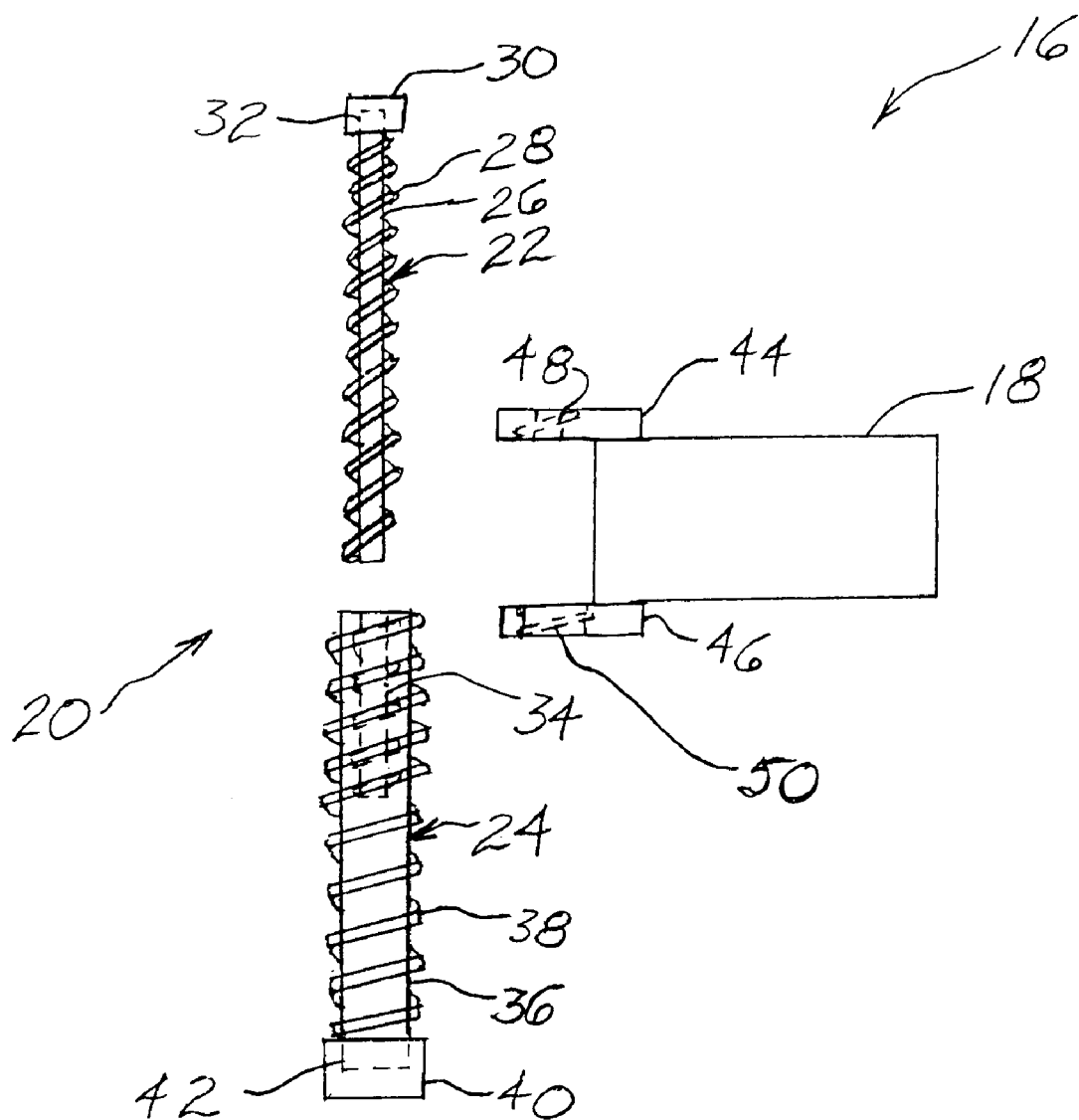
FIG. 3 is a partially exploded side view of one embodiment of the present invention.

With reference to FIG. 3, the vision visor 16 includes a visor plate 18. The visor plate 18 may be of a plastic or glass that is at least partially translucent. The plastic or glass may be treated as known in the art to prevent some light from passing through it, for example, by polarization or tinting. It is important to note that while the corners of the visor plate 18 are illustrated as square, they may alternatively be rounded to prevent the puncture of an airbag that might be deployed.

The dimensions of the visor plate 18 are large enough to encompass at least a portion of the field of vision of the driver of the vehicle, yet small enough to be easily moved out of the way when the visor 16 is not needed. Such a size allows the driver to lean towards the visor plate 18 and look through it when, for example, oncoming vehicles with bright headlights are approaching, allowing the visor plate 18 to block at least some of the light and reduce the light that reaches at least one eye of the driver. When the oncoming vehicle has passed, the compact size of the visor plate 18 allows the driver to easily move it to a location that is not within a direct field of vision. An exemplary size for the visor plate 18 is approximately three (3) inches high and approximately five (5) inches long, with a thickness ranging from about one sixty-fourth (1/64) of an inch to about one (1) inch.

An exemplary means for connecting the visor plate 18 to the vehicle is also shown in FIG. 3. A post assembly 20 includes an upper post 22 and a lower post 24. The upper post may be a shaft 26 with threads 28, essentially a threaded rod or tube. A removable upper end cap 30 of rubber or soft plastic receivably engages a top end of the upper post 22 in a cavity 32.

The lower post 24 defines a tapped cavity 34 that corresponds to the threads 28 of the upper post 22, allowing the lower post 24 to adjustably receive the upper post 22. The lower post 24 may include a shaft 36 with threads 38, essentially a threaded tube. A removable lower end cap 40 of rubber or soft plastic receivably engages a bottom end of the lower post 24 in a cavity 42.

The posts 22 and 24 may be of polymeric material, such as poly vinyl chloride (PVC), thereby providing a relatively low hardness, to minimize scuffing of the interior components of the vehicle, as well as a relatively light weight for the assembly 16. The posts 22 and 24 may be of a dark color, such as black, to reduce noticeability. The posts 22 and 24 are of a length sufficient to adjustably extend, when assembled, from a dashboard of a vehicle to an inner surface of the roof of the vehicle, as will be described in greater detail below. For example, in the illustrated embodiment, each post 22 and 24 may be approximately twelve (12) inches long, allowing the assembly 16 to be adjusted between a maximum height of twenty-four (24) inches and a minimum of twelve (12) inches.

The diameter of each post 22 and 24 is sufficient to impart structural stability to the assembly 16, yet small enough to minimize any potential impediment to the driver's field of vision, such as from about one-quarter (1/4) of an inch to about one (1) inch. For example, the upper post 22 may be about five-eighths (5/8) of an inch in diameter and the lower post 24 may be of a slightly larger diameter, such as about three-quarters (3/4) of an inch, to allow insertion of the upper post 22. It is to be noted that the upper post 22 may be of a larger diameter than the lower post 24, allowing the lower post 24 to be inserted into the upper post 22.

It is also to be noted that alternative configurations for the posts 22 and 24 are possible. In the illustrated embodiment, the posts 22 and 24 are shown with different diameters, however, the posts 22 and 24 may be of the same maximum diameter, with one post (such as the upper post 22) including a necked portion of a smaller diameter that may be threaded to engage a tapped cavity defined in the other post (i.e., the lower post 24). In addition, one post 22 may slide inside of the other 24, without the use of threads, and a locking pin, tab, or other friction means as known in the art may secure the position of the inner post 22 in the outer post 24.

With continuing reference to FIG. 3, a means for connecting the visor plate 18 to the posts 22 and 24 is also illustrated. A top connector 44 and a bottom connector 46 are integrally connected to the visor plate 18 and facilitate removable and adjustable engagement of the visor plate 18 to the posts 22 and 24. The top connector 44 defines a first orifice 48 that is tapped and corresponds to the threads 28 of the upper post 22. The bottom connector 46 defines a second orifice 50 that is tapped and corresponds to the threads 38 of the lower post 24.

Because the visor plate 18, the top connector 44 and the bottom connector 46 are molded or fastened together as a single unit, they may be inserted over the top of the upper post 22 when the upper end cap 30 is removed and turned on the threads 28 and 38 until the desired level for the visor plate 18 is reached. Other means to secure the visor plate 18 to the posts 22 and 24 are possible, such as clamps that extend from the visor plate 18 to removably engage the posts 22 and 24, or other similar means known in the art. In addition, the visor plate 18 and any connectors (such as the top 44 and bottom 46 connectors) may be connected by adjustable means, such as a hinge pin or hinge tabs that extend through the visor plate 18 and to the connectors 44 and 46.

Figure 4:
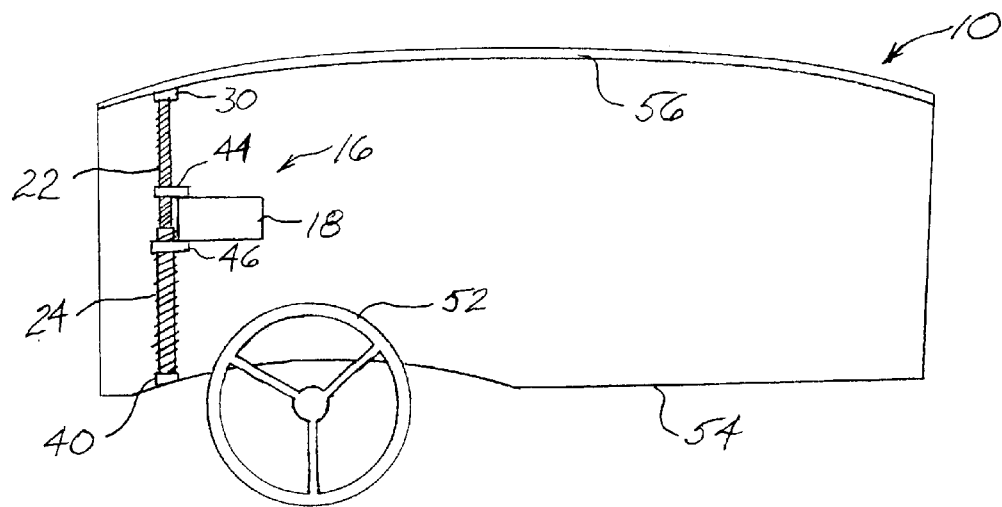
FIG. 4 is a perspective view of the embodiment of the present invention shown in FIG. 3 installed in a vehicle and in use.

Turning now to FIG. 4, the vision visor assembly 16 is shown installed in the vehicle 10. The posts 22 and 24 are located to the side of the steering wheel 52 and extend from the dashboard 54 to an interior surface of the roof 56. The posts 22 and 24 may be installed first by screwing the upper post 22 into the lower post 24 and adjusting the overall length of the assembled posts 22 and 24 to be slightly less than the distance between the dashboard 54 and the roof 56. The visor plate 18 is screwed onto the posts 22 and 24, as described above, and is turned to a level that corresponds to the eyes of the driver of the vehicle 10. The upper 30 and lower 40 end caps are placed on the corresponding upper 22 and lower 24 posts and the posts 22 and 24 are then extended slightly by unscrewing them until they firmly contact the dashboard 54 at the lower end and the roof 56 at the upper end to secure the assembly 16.

The construction of the posts 22 and 24 from polymeric material, as described above, imparts a degree of flexibility to the assembled visor unit 16. Should the driver's airbag be deployed, this flexibility allows the airbag to knock the assembly 16 aside, rather than to preclude deployment.

When the light from an intense light source, such as the headlights of an oncoming vehicle, is sensed the driver twists or swings the visor plate 18 so that the visor plate 18 is between the light and her or his eyes. Because the visor plate 18 is at least partially translucent and of a rather compact size, large objects may still be seen, but the amount of light reaching the driver's eyes from the headlights of the oncoming vehicle or other light source is reduced, thereby reducing or eliminating any flash blindness. If desired, the driver may lean towards the visor plate 18 to place both eyes substantially behind the plate 18, thereby reducing the light from the light source that may reach her or his eyes even more.

Figure 5:
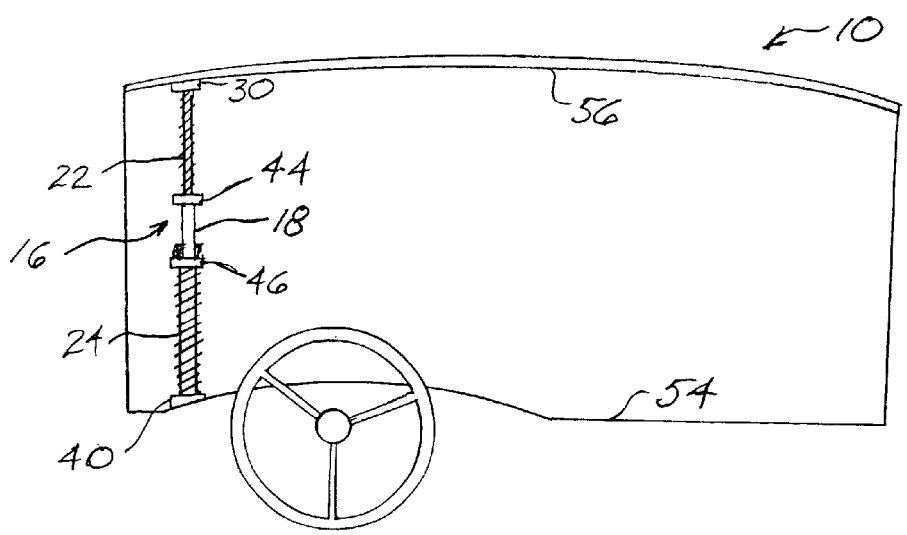
FIG. 5 is a perspective view of the embodiment of the present invention shown in FIG. 3 installed in a vehicle and not in use.

With reference to FIG. 5, when the use of the vision visor 16 is not necessary, such as when the oncoming vehicle has passed or the intense light source is out of the driver's field of vision, the visor plate 18 may be swung to the side, substantially out of the main field of vision of the driver. In this manner, the visor plate is readily and easily available when needed. Moreover, if the level of the visor plate 18 is to be adjusted after the assembly 16 is installed, the driver may simply twist or turn the visor plate 18 about the posts 22 and 24 to lower or raise the position of the plate 18.

As is apparent from the foregoing detailed description, a method for the use of the vision visor 16 is also disclosed. The method comprises the use of the vision visor 16 in accordance with the steps presented in FIGS. 2 through 5, and particularly FIGS. 4 and 5.

The invention has been described with reference to preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A vision visor for a motorized vehicle, comprising:
   a visor plate that is at least partially translucent;
   a post assembly that is adjustably connected to an interior portion of the vehicle, wherein the post assembly includes an upper post that engages an inner surface of the roof of the vehicle and a lower post that engages a dashboard of the vehicle, and wherein the lower post adjustably engages the upper post; and
   a connector fastened to the visor plate and adjustably connected to the post assembly, whereby the visor plate may be selectively placed between at least one eye of a driver of the vehicle and light emitted from a light source.

2. The vision visor for a motorized vehicle of claim 1, wherein the visor plate is of one of plastic or glass.

3. The vision visor for a motorized vehicle of claim 2, wherein the visor plate is polarized.

4. The vision visor for a motorized vehicle of claim 2, wherein the visor plate is tinted.

5. The vision visor for a motorized vehicle of claim 1, wherein the visor plate is approximately three (3) inches high and approximately five (5) inches long.

6. The vision visor for a motorized vehicle of claim 1, wherein the visor plate includes rounded edges.

7. The vision visor for a motorized vehicle of claim 1, wherein at least one of the upper post and the lower post include threads on an outer diameter, and the connector is tapped, whereby the tapped connector engages the threads.

8. The vision visor for a motorized vehicle of claim 1, wherein the outer diameter of at least one of the upper post and the lower post is in a range of about one-quarter (¼) of an inch to about one (1) inch.

9. The vision visor for a motorized vehicle of claim 1, wherein the length of at least one of the upper post and the lower post is about twelve (12) inches.

10. The vision visor for a motorized vehicle of claim 1, further comprising an upper end cap capable of removably engaging the upper post and a lower end cap capable of removably engaging the lower post.

11. The vision visor for a motorized vehicle of claim 1, wherein the engagement of the lower post to the dashboard and the engagement of the upper post to the inner surface of the roof is to the left of a steering wheel of the vehicle.

12. A vision visor for a vehicle, comprising:
   a visor plate that is at least partially translucent;
   an upper post having an upper end and a lower end;
   a lower post having an upper end and a lower end, whereby the upper end of the lower post adjustably engages the lower end of the upper post, the lower end of the lower post engages a dashboard of the vehicle, and the upper end of the upper post engages an inner surface of the roof of the vehicle; and
   at least one connector that is fastened to the visor plate and removably engages at least one of the upper post and the lower post.

13. The vision visor for a vehicle of claim 12, wherein the lower post defines a tapped cavity and the upper post is threaded, whereby the threads on the upper post removably engage the tapped cavity of the lower post.

14. The vision visor for a vehicle of claim 12, wherein at least one of the upper post and the lower post include threads on an outer diameter and the at least one connector is tapped, whereby the tapped connector engages the threads.

15. The vision visor for a vehicle of claim 12, wherein the engagement of the lower end of the lower post to the dashboard and the engagement of the upper end of the upper post to the inner surface of the roof is to the left of a steering wheel of the vehicle.

16. The vision visor for a vehicle of claim 12, wherein at least one of the upper post and the lower post includes a flexible material.

17. The vision visor for a vehicle of claim 12, wherein the visor plate is of one of plastic or glass.

18. The vision visor for a vehicle of claim 17, wherein the visor plate is polarized.

19. A method for using a vision visor for a vehicle, comprising the steps of:
   providing a visor plate that is at least partially translucent and adjustably connected by a post assembly to an interior portion of the vehicle, wherein the post assembly includes an upper post that engages an inner surface of the roof of the vehicle and a lower post that engages a dashboard of the vehicle, and wherein the lower post adjustably engages the upper post;
   placing the visor plate between at least one eye of a driver of the vehicle and light emitted from a light source; and
   removing the visor plate from a substantial portion a the field of vision of the driver when there is no light emitted from the light source.

20. The method for using a vision visor for a vehicle of claim 19, wherein the step of placing the visor plate includes swinging the visor plate from a point at the left side of the driver.

* * * * *